United States Patent Office 3,328,675
Patented June 27, 1967

3,328,675
DEVICE FOR CONTROLLING THE EFFECTIVE VALUE OF AN ALTERNATING LOAD VOLTAGE
Konrad Samberger, Finsing, and Rudolf Basner, Munich, Germany, assignors to Siemens-Schuckertwerke Aktiengesellschaft, Berlin-Siemensstadt, Germany, a corporation of Germany
Filed July 17, 1963, Ser. No. 295,764
Claims priority, application Germany, July 30, 1962, S 80,654
6 Claims. (Cl. 323—22)

Our invention relates to devices for controlling or regulating the effective value of an alternating voltage applied to a load.

It is known to use saturable reactors for this purpose. For symmetrical control of both voltage half-waves, two such reactors in series with respective two diodes connected in a doubler circuit are required. The magnetizable cores of the reactors are provided with respective control windings to be energized by a controlling direct current. The magnetizing condition of such reactors depends upon the voltage-time integral of the applied voltage. Between its saturation limits, each reactor can absorb only a given voltage-time integral. The magnitude of this integral can be adjusted by correspondingly varying the pre-magnetization effected by the direct current supplied to the control windings.

Aside from the relatively large requirements with respect to material and space, such control and regulating devices are relatively tardy, because the control circuits must be made high-ohmic and therefore have large time constants.

Another way of controlling the effective value of an alternating voltage is to connect the load through two anti-parallel thyratrons or corresponding semiconductor controlled rectifiers to the source of alternating voltage. The two switching devices are alternately supplied with ignition pulses in respective sequential half-wave periods of the alternating feeder voltage, and the phase position of the ignition pulses relative to the voltage cycle determines the effective value of the load voltage.

The control of such equipment requires the use of two control units which alternately furnish the ignition pulses for the two electronic switching devices. It is difficult to design these two control units identically to such an extent that the phase position of the respective ignition pulses is exactly the same in the respective half-wave periods of the feeder voltage. Such accuracy, however, is always required if no direct-current component is to pass through the load, as is the case, for example, when the equipment is used for controlling the brightness of fluorescent lamps or for the control of welding transformers.

Aside from such technical difficulties, an antiparallel connection is unsatisfactory in many cases for economical reasons, particularly because semiconductor controlled rectifiers for power requirements are relatively expensive in comparison with other components.

It is an object of our invention to devise an apparatus for controlling the effective value of an alternating load voltage that affords greatly reducing the amount and space requirements of the equipment needed.

To this end, and in accordance with our invention, we combine the above-mentioned two known control principles and connect between the load and the alternating-voltage source an ignition-controllable electronic switching device, preferably a semiconductor controlled rectifier, and also a saturable reactor in parallel connection with each other.

The reactor is provided with a core whose magnetizable material has an essentially rectangular hysteresis characteristic and preferably is dimensioned so that the time-voltage integral (or area) is just sufficient during a half wave of the alternating feeder voltage for reversely magnetizing the core from the positive to the negative saturation and vice versa. The control path or ignition electrode of the switching device is supplied with periodic ignition pulses whose sequence frequency corresponds to the frequency of the alternating feeder voltage and whose phase position, relative to the individual cycle periods of the alternating feeder voltage, determines the effective value of the load voltage.

According to another feature of our invention, we provide a second winding on the magnetizable core of the saturable reactor for the purpose of limiting the voltage applied to the semiconductor controlled rectifier, and we connect the additional reactor winding through a two-way rectifier to a direct voltage. The ratio between the number of turns of the reactance winding, and the additional winding on the reactor core is chosen such that the diodes conduct when the voltage at the controlled rectifier reaches a chosen limit value. Such a voltage limitation is particularly desirable in cases where L-C filter network, particularly a series resonance network, is connected between the saturable reactor and the load, as is always the case if the load is to be supplied with a sinusoidal alternating voltage whereas the voltage source furnishes a voltage of different curve shape, such as a rectangular voltage wave. This would occur for example, when a rectangular feeder voltage is supplied by an inverter operating with semiconductor controlled rectifiers or transistors and translating direct current into alternating current. Then the second winding on the saturable reactor is preferably connected through the above-mentioned two-way diodes directly to the source of direct voltage which energizes the inverter. Equipment of such type preferably is used for operating fluorescent lamps on vehicles where only greatly fluctuating direct voltages are available. In such cases, a constant load voltage can readily be applied to the lamps or other loads by varying the ignition angle (phase position) of the controlled rectifier in dependence upon a departure of the load voltage from a predetermined datum value.

The invention will be further explained with reference to the accompanying drawings in which.

Figure 1:
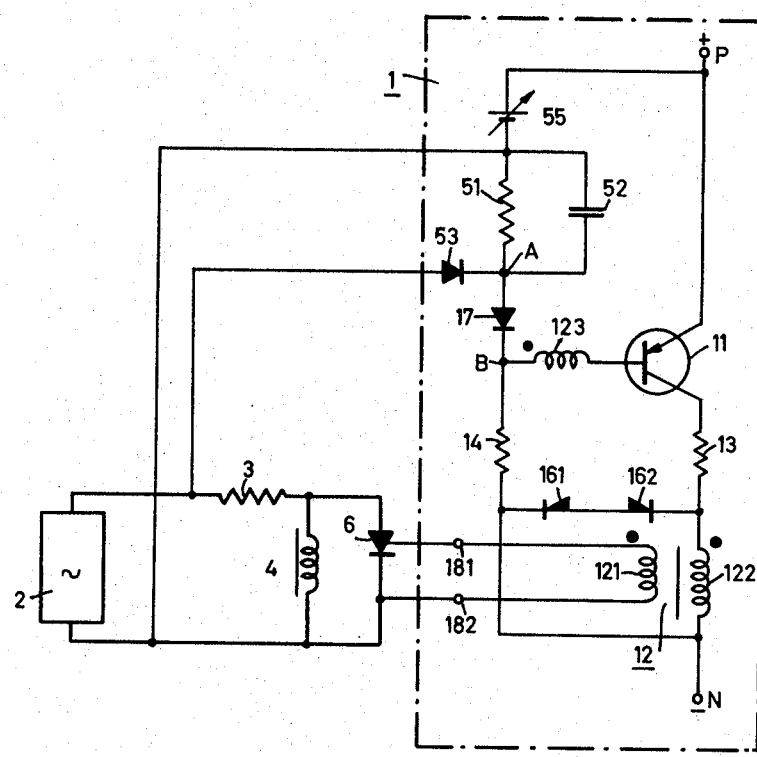
FIG. 1 is a circuit diagram showing an example of a device for supplying controlled voltage to a load from an alternating-voltage source.

According to FIG. 1, an alternating-current source 2 energizes a load 3 through a series connected saturable reactor 4. A controlled electronic rectifier 6, preferably a silicon controlled rectifier (SCR), has its main path connected parallel to the reactor 4. The ignition control circuit of the controlled rectifier 6 is connected to an ignition control unit 1 of any suitable known design which furnishes ignition pulses periodically at a sequence frequency corresponding to the frequency of the source voltage.

In the illustrated example, the ignition control unit comprises a transformer 12 whose secondary winding 121 is connected to the control path of the SCR 6 and whose primary winding 122 is connected to a direct-voltage source at terminals P and N in series with a current-limiting resistor 13 and in series with the emitter-collector path of a transistor 11. Two Zener diodes 161, 162 in series opposition are connected in parallel to the primary winding 122. The base of the transistor is connected on the one hand to the negative direct-voltage terminal N through a feedback winding 123 on transformer 12, and on the other hand to a terminal A through a diode 17. An auxiliary voltage source is connected between terminals A and P. This auxiliary source comprises a condenser 52 which is charged through a rectifier 53 from the alternating-voltage source 2 and is discharged through a parallel-connected resistor 51. The auxiliary source further comprises a series-connected source 55 of the adjustable direct voltage.

Figure 3:
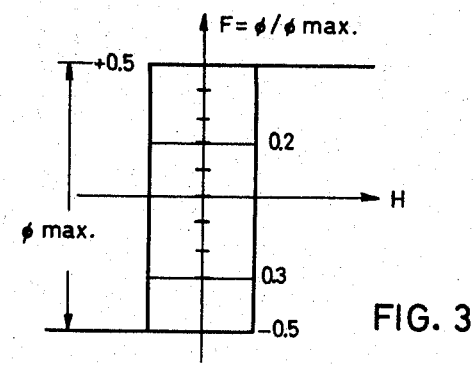
FIG. 3 is another explanatory diagram relating to the saturable reactor used in the device.
Figure 2:
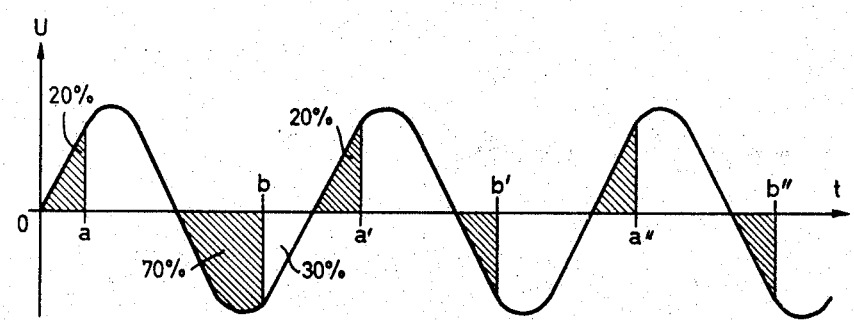
FIG. 2 is an explanatory diagram relating to the same device.

The performance of the device will be explained with reference to FIGS. 2 and 3. FIG. 2 indicates the wave of the alternating feeder voltage U (ordinate) in dependence upon time $t$ (abscissa). Shown in FIG. 3 is the magnetization characteristic of the reactor 4 by showing the magnetic flux F (ordinate) in dependence upon the field strength H. For simplicity, the flux F is shown as the ratio of the instantaneous flux $\theta$ to the constant value $\theta_{max}$. The term $\theta_{max}$ denotes the difference between the flux values corresponding to the positive and the negative saturation respectively. Preferably the dimensions of the saturable reactor are such that the time-voltage integral for one half wave of the feeder voltage (FIG. 2) just corresponds to this value $\theta_{max}$, so that the reactor during one half-wave period is just reversely magnetized from negative saturation to positive saturation or vice versa. For such pre-magnetization the value of $F=1$.

Assume that the SCR-device 6 always receives an ignition pulse from the ignition control unit 1 at the periodic moment $t=a$ as identified in the voltage-time diagram of FIG. 2. This moment, dependent upon the magnitude of source 55, is chosen so that 80% of the time-voltage integral, corresponding to 80% of the area between the abscissa and the positive half wave is effective upon the load 4. Consequently, the saturable reactor 4 absorbs 20% of the voltage-time integral corresponding to 20% of the positive half-wave area. The magnetizing condition of the reactor core, represented diagrammatically in FIG. 3, is characterized at the end of the first positive half wave by the value $F=0.2$. During the next following negative half wave, the SCR 6 is blocked and the reactor 4 is magnetized in the negative direction starting from the point $F=0.2$. However, the reactor can absorb only 70% of the total negative half-wave area under these conditions. At the moment $t=b$ as identified in FIG. 2, the negative saturation of the core at the value $F=-0.5$ is reached. Consequently, 30% of the negative half-wave area is applied to the load 3.

Commencing with the next following zero passage, that is, at the starting point of the second positive half wave, up to the moment $t=a'$, at which the SCR 6 is again ignited, the reactor is reversely magnetized starting from the value $F=-0.5$ to the value $F=-0.3$, because the time point $t=a'$ is such that 80% of the half wave is applied to the load whereas the total half wave is required for a complete reverse magnetization of the reactor.

At the end of the second positive half wave, the SCR 6 is turned off as soon as the current through the SCR becomes approximately zero in the vicinity of the voltage zero passage. After the zero passage, the reactor 4 is again magnetized in the direction toward negative saturation, starting from the point $F=-0.3$. During this interval, the load is traversed only by the very small magnetizing current. At the moment $t=b'$ the reactor is again saturated so that from this moment on the alternating feeder voltage is again applied to the load.

From this moment on, the reactor is reversely magnetized during the negative half waves toward negative saturation by exactly the same amount as it became magnetized during the positive half waves in the direction toward positive saturation. The amount of the time-voltage integral or half-wave area then being absorbed by the reactor corresponds exactly to those time-voltage integrals during which the SCR 6 was turned off during the positive half wave of the alternating feeder voltage. The phase angle of cut-off during which the alternating feeder voltage is virtually ineffective with respect to the load during the positive as well as during the negative half waves can thus be controlled by a single periodic ignition pulse supplied to the SCR during the positive half wave of each voltage cycle. Thus a single ignition control unit and correspondingly simple circuitry are sufficient for obtaining the desired voltage controlling or regulating performance.

While the above-mentioned dimensioning of the saturable reactor 4 so as to be just reversely magnetized between positive and negative saturation by one voltage half-wave of the feeder current affords the optimal possibility of voltage control virtually between 0° and 180°, such dimensioning is not critical, as the fundamental performance of the invention is not affected by departures from the optimum.

Figure 4:
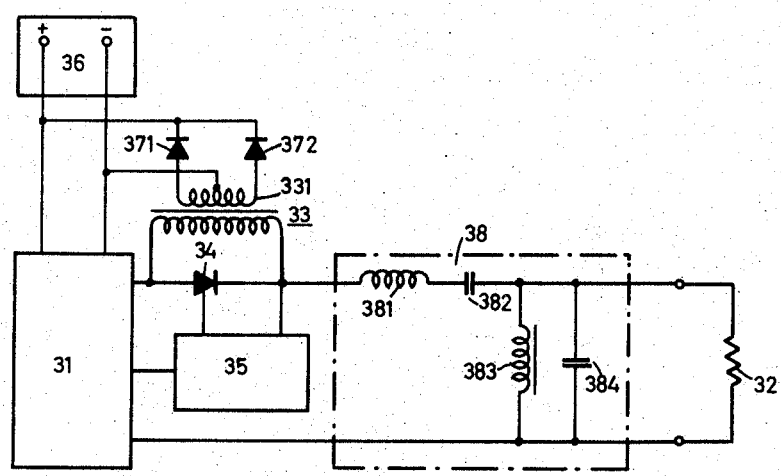
FIG. 4 is a schematic diagram showing an example of another embodiment in which a load is supplied with controllable or regulated voltage from an inverter energized from a source of direct current.

In the embodiment of the invention illustrated in FIG. 4, the load 32 is supplied with alternating feeder voltage from a source 31 which in this case is constituted by an inverter energized from a direct-voltage source 36. A saturable reactor 33 is series connected between the inverter 31 and the load 32, and a controlled electronic rectifier, preferably a silicon controlled rectifier or similar semiconductor device (SCR) 34 is connected parallel to the reactor 33. The core of the reactor 33 is provided with a second winding 331 which has a mid-tap and is connected by two diodes 371 and 372 in mid-tap connection to the energizing source 36 of direct voltage. That is, the mid-tap of winding 331 is connected to one pole, here shown to be the negative pole of the direct-voltage source 36, whereas the two diodes 371 and 372 connect the respective ends of the winding with the other, here positive, pole of the same source 36, the two diodes being poled in the same direction. Connected between the load 32, for example a fluorescent lamp, and the reactor-SCR assembly is an L-C filter network 38. In the illustrated embodiment the filter network is formed of a parallel-resonance circuit comprising a reactance coil 383 and a capacitor 384, both parallel connected to the load 32; and a series-resonance circuit formed of an inductance coil 381 and a capacitor 382 are connected in series between the parallel-resonance circuit and the reactor-SCR assembly.

The ignition control unit 35 is connected as the ignition control unit 1 of FIG. 1 and may comprise the same circuitry as the unit 1.

In this device, the effective value of the load voltage is varied in the same manner as explained above with reference to FIG. 1. The L-C filter 38 serves for converting the non-sinusoidal, for example rectangular-wave voltage of the inverter into a sinusoidal voltage. This circuit is likely to result in high over-voltages at the SCR 34 depending upon the ignition angle, such high voltages being caused by the capacitors in the filter network. However, the voltage that can become effective at the semiconductor controlled rectifier 34 is limited by the mid-tapped auxiliary winding 331 on the saturable reactor 33, in conjunction with the two-way rectifier circuit connected thereto. The diodes 371 and 372 are both poled to be normally nonconductive so that, in effect, the direct-voltage source 36 is disconnected from the auxiliary winding 331. However, when the voltage at the controlled rectifier 34 and consequently across the reactance winding of the saturable reactor 33 exceeds a given limit value which is essentially determined by the design of the controlled rectifier 34, then the diodes 371 and 372 become conductive. As a result, the low internal resistance of the voltage source 36 is parallel connected through the winding 331 to the semi-conductor controlled rectifier, so that the voltage at the controlled rectifier can no longer increase appreciably. Such an operation is readily obtainable by suitable choice of the number of turns in winding 331 for any source of feeder voltage being used. Suitable as direct-voltage source for connection to the winding 331 is also a separate auxiliary source such as a battery or a capacitor to act as current storage device. For example, the auxiliary winding 331 may be connected through the diodes 371 and 372 across a capacitor charged from the source 36 or any other desired direct-voltage source. In this case, a voltage-dependent discharge resistor is preferably connected parallel to the capacitor.

It will be understood that the load 3 or 32 in devices of the kind described may be connected to the feeder voltage through a rectifier circuit if the load is to be energized by unidirectional voltage. By varying the phase position of the ignition pulses supplied to the controlled rectifier 6 or 34, the median value of the direct voltage impressed upon the load can then be adjusted or regulated in the same manner as explained above with reference to an alternating load voltage.

To those skilled in the art, it will be obvious upon a study of this disclosure that devices according to our invention may be modified in various respects or may be provided with additional auxiliary circuit components, or may form a component in more comprehensive circuitry. The invention therefore can be given embodiments other than particularly illustrated and described herein, without departing from the essential features of our invention and within the scope of the claims annexed hereto.

We claim:

1. A device for controlling the effective value of an alternating voltage applied to a load, comprising alternating voltage feeder means, a load circuit connected to said feeder means, a saturable reactor having a main winding and a second winding, said main winding being series connected in said load circuit, direct current supply means connected to said second winding, rectifier means interposed between said direct current supply means and said second winding and connected with a determined polarity, a switching half-wave rectifier having a main current path parallel connected with said main winding and having a pulse-responsive ignition circuit for controlling the load voltage in dependence upon the phase position of ignition pulses applied to said ignition circuit.

2. In a voltage control device according to claim 1, said load circuit comprising load means to be controlled and an L-C filter network between said saturable reactor and said load means.

3. In a voltage control device according to claim 1, said second winding having a mid-tap and two ends, and said direct voltage supply means comprising positive and negative leads of which one is connected to said mid-tap, and two diodes connected between said other lead and the two ends respectively of said second winding, said two diodes having the same polarity relative to said other lead, whereby said diodes commence conducting when the voltage at said main winding and switching rectifier exceeds a given value.

4. A device as claimed in claim 1, wherein said saturable reactor has a magnetizable core of material having an essentially rectangular hysteresis characteristic and being dimensioned for reverse magnetization from positive to negative remanence condition by just one half wave of the voltage provided by said feeder means.

5. A device for controlling the effective value of an alternating voltage applied to a load, comprising a direct current source, an inverter connected to said source and having output terminals for providing an alternating feeder voltage, a load circuit connected to said terminals, a saturable reactor having a main winding and a second winding, said main winding being series connected in said load circuit, said second winding having two equal and mutually opposed winding portions connected to said direct current source, two diodes being interposed between each winding portion and said source and connected with polarities for normally preventing flow of current from said source through said winding portions, a semiconductor switching half-wave rectifier having a main path parallel connected with said reactor main winding and having an ignition circuit, and pulse supply means in said ignition circuit for applying periodic ignition pulses to said rectifier, whereby the effective value of the load voltage depends upon the phase position of the ignition pulses relative to the cycle of the feeder voltage and said diodes commence conducting to limit the load current when the voltage at said rectifier exceeds a given value.

6. A device as claimed in claim 4, wherein said saturable reactor has a magnetizable core of material having an essentially rectangular hysteresis characteristic and being dimensioned for reverse magnetization from positive to negative remanence condition by just one half wave of said feeder voltage.

References Cited

UNITED STATES PATENTS

| 1,969,550 | 8/1934 | Evans | 323—86 X |
| 2,054,496 | 6/1936 | Craig | 323—86 |
| 2,965,832 | 12/1960 | Lode | 323—18 |
| 3,018,383 | 1/1962 | Ellert | 307—88.5 |
| 3,141,125 | 7/1964 | Kurimura et al. | 323—82 X |
| 3,158,799 | 11/1964 | Kelley et al. | 321—27 |
| 3,192,468 | 6/1965 | Buchanan et al. | 323—22 |
| 3,197,691 | 7/1965 | Gilbert | 321—18 |
| 3,293,539 | 12/1966 | Chambers | 323—22 |

OTHER REFERENCES

Electromechanical Design, vol. 6, No. 3, March 1962, Glasberg article, "Silicon Controlled Rectifiers."

JOHN F. COUCH, *Primary Examiner.*

LLOYD McCOLLUM, *Examiner.*

W. E. RAY, W. M. SHOOP, *Assistant Examiners.*